Patented June 1, 1954

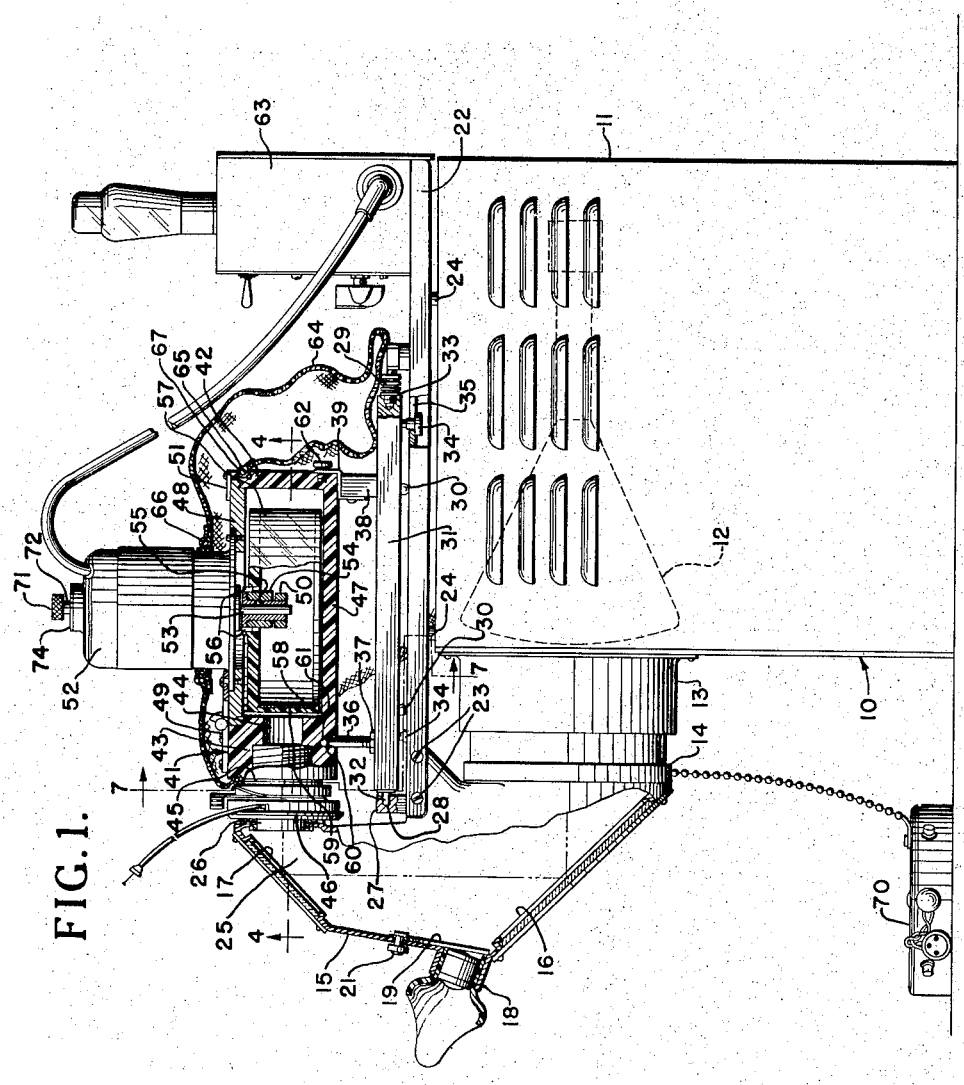

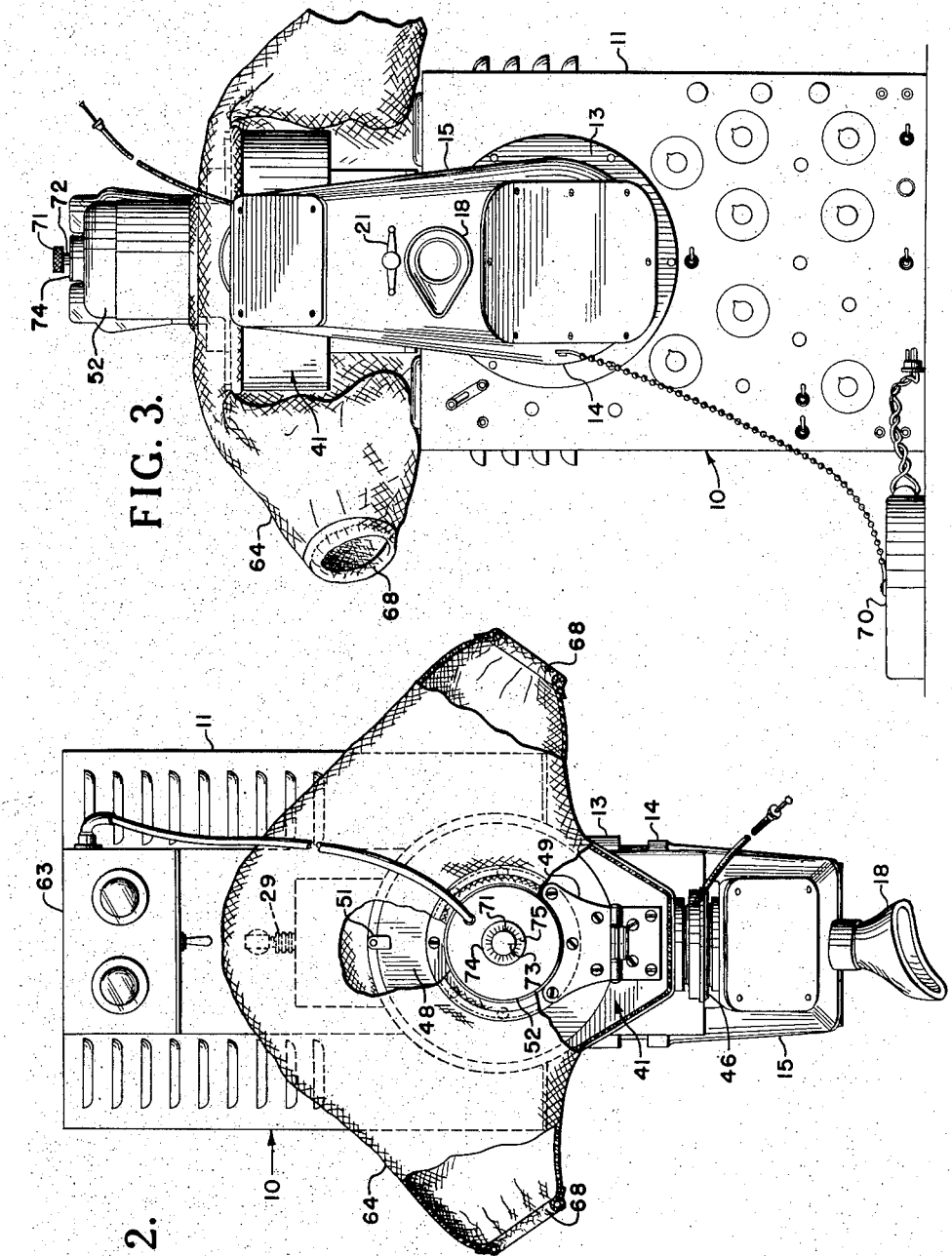

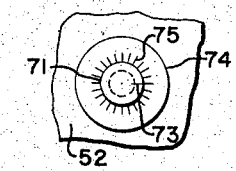
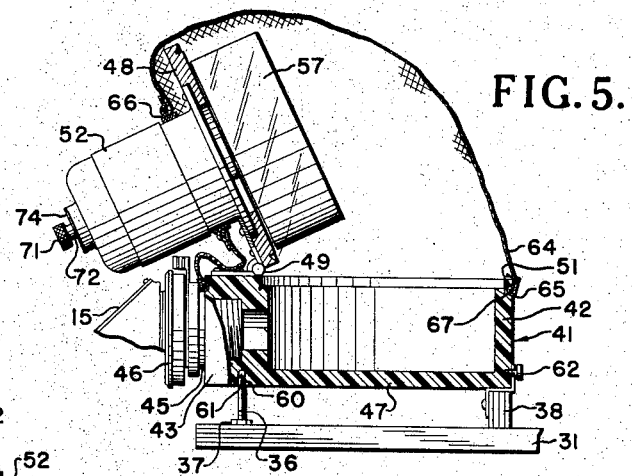
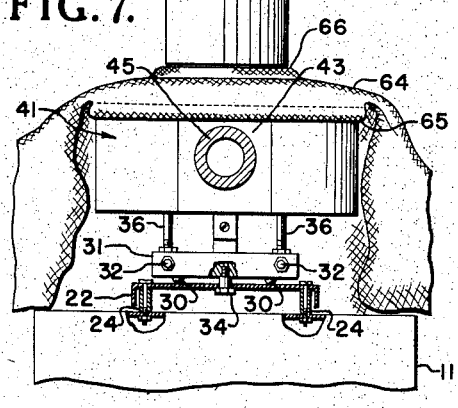
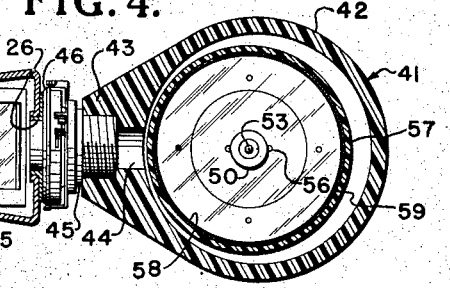
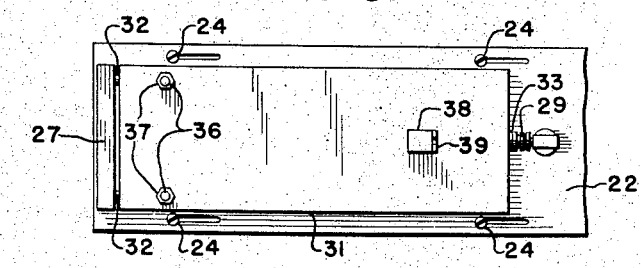

2,680,055

UNITED STATES PATENT OFFICE 2,680,055

HIGH-SPEED DRUM CAMERA FOR OSCILLOGRAPH RECORDING

Frank W. Hayward, Takoma Park, and Charles J. Zablocki, Silver Spring, Md.

Application July 17, 1950, Serial No. 174,342

4 Claims. (Cl. 346—110)

(Granted under Title 35, U. S. Code (1952), sec. 266)

The present invention relates to high-speed photography and more particularly to improvements in high-speed cameras for use with cathode-ray oscilloscopes and the mounting arrangement therefor.

The camera and apparatus employed in the present invention is an improvement on that disclosed in our application for High Speed Camera, Serial No. 108,832, filed August 5, 1949, now Patent Number 2,645,169, issued July 14, 1953, in which the camera is mounted in front of an oscillograph with the lens of the camera in axial alignment with the cathode-ray tube.

In the present invention a periscope having a pair of reflector elements is employed to provide for positioning the camera above the oscillograph casing, the camera being mounted on a slide table secured to the top of the oscillograph casing. While provision has been made for quick detachment of the camera from the table, the positioning of the camera lens with respect to the lens opening in the periscope is accomplished with a high degree of accuracy.

The camera in the present invention is provided with a well-known shutter and lens combination, the shutter being mounted between the lenses and having "time," "bulb," and a plurality of different time exposure settings, the lens being of any variety suitable for the purpose preferably 50 mm. f1.5.

The periscope is a well-known variety having a pair of reflectors to reflect the image projected on the face of the cathode-ray tube to a position above the casing of the oscillograph and is provided with a filtered direct viewing port. The periscope is also provided with a data card recording device, in order that pertinent data relating to a test may be photographed on a portion of the film to be used in the test.

The camera is provided with a hinged cover and, if desired, the film used in the camera may be removed therefrom or inserted therein without removing the camera from its operative position. The foregoing operation is accomplished by the use of a dark bag specifically arranged for the camera employed in the present invention, the operator transferring the film from a film or developing can within the dark bag to the camera drum or from the camera drum to the can.

It also may be desired that the dark bag be removed when a dark room is convenient. In such case the camera is removed from the support and the film is removed therefrom or inserted therein in the dark room.

An object of the present invention is to provide an improved camera for oscillographs which is positioned conveniently above the oscillograph casing.

Another object is to provide a support for said camera whereby the camera is readily mounted thereon and dismounted therefrom.

Still another object is to provide a support whereby the horizontal alignment of the camera with respect to the lens receiving opening of the periscope may be accurately accomplished.

A further object is to provide a high-speed drum type camera for photographing the trace of an oscilloscope wherein the film may be readily removed therefrom or inserted therein without the use of a dark room.

Other objects and many of the attendant advantages of this invention will be readily appreciated as the same becomes better understood by reference to the following detailed description when considered in connection with the accompanying drawings wherein:

Fig. 1 is a view in side elevation with portions in section of the device of the present invention;

Fig. 2 is a view in top plan of the device;

Fig. 3 is a front elevational view thereof;

Fig. 4 is a sectional view taken along the line 4—4 of Fig. 1;

Fig. 5 is a sectional view of the camera and dark bag and illustrating the camera in the open position;

Fig. 6 is a fragmentary plan view of the motor employed in the present invention and showing the graduations and marker;

Fig. 7 is a sectional view taken on line 7—7 of Fig. 1; and

Fig. 8 is a top plan view of the supporting tables for the camera.

Referring more particularly to the drawings, wherein like numerals indicate like parts throughout the several views, 10 indicates generally an oscillograph having a casing 11 containing among other elements a cathode-ray tube 12. A light excluding and mounting collar 13 is secured to the casing 11 and surrounds the viewing opening of the casing 11. Slideably mounted in collar 13 in light excluding engagement therewith is the lower portion 14 of a periscope 15. Periscope 15 is of a well-known variety having a pair of reflector elements 16 and 17, and a direct viewing arrangement 18 having a closure 19 which is moved into or out of closed position by the operating means 21. The reflector elements 16 and 17 are each mounted at an angle of substantially 45° in such manner as to reflect the image of the trace of the cathode-ray tube to a point above the casing 11 and in a reverse direction.

The periscope 15 is supported on a table 22 by screws 23, the table being slideably supported on the casing 11 as at 24, whereby the periscope may be conveniently withdrawn from the collar 13 such, for example, as to photograph information pertinent to the particular test contained on a card (not shown) placed in data card illuminating device 70 by applying the device 70 on the lower portion 14 of the periscope 15 and exposing a portion of the film strip in a camera which will be hereinafter more fully described.

The upper portion 25 of periscope 15 is provided with a camera lens receiving opening 26 facing in a direction toward and above casing 11.

A camera mounting block 27 is secured to the front end of table 22. Mounting block 27 is provided with a pair of openings 28 for a purpose to be hereinafter more fully described. A pivoted screw locking means 29 is mounted adjacent the rear portion of table 22.

A camera supporting table 31 is provided with a pair of pins 32, Fig. 8, at the front end thereof for insertion into the openings 28, while at the opposite end thereof table 31 is provided with a pressure disk 33 which is screwed thereinto to receive the thrust of locking means 29, as illustrated in Fig. 1.

Table 31 is provided with a plurality of orifices in the lower face thereof to receive a plurality of balls 30, the balls resting on the top face of table 22, thus to provide a sliding and rolling support for table 31 on table 22. Headed guide pins 34 are screwed into the lower face of table 31 and extend through elongated slots 35 in table 22 whereby table 31 is constrained for limited lineal movement toward or away from the lens opening.

Posts 36 are threadedly mounted in table 31 and extend vertically therefrom. Lock nuts 37 are mounted on the threaded portions of posts 36 in order to lock the posts in a selected extended height above the surface of table 31. A supporting post 38 is mounted on table 31 adjacent the rear portion thereof and has extending therefrom a notched angle bracket 39.

The camera employed in the present invention is indicated generally at 41 and has a substantially hollow cylindrical casing 42. One side of the casing 42 is formed with an extension 43 having a bore 44 therein, a portion of the bore being enlarged to threadedly receive the shank of an adapter 45, to which is attached the shutter and lens combination 46.

As heretofore described, the shutter is of any well-known between-the-lenses variety capable of providing time, bulb and instantaneous exposures, the instantaneous exposures being settable to a plurality of different measured durations. The lens combination employed in the present instance may be of any variety having the necessary qualities of optical excellence, speed of light transmission and, of course, the proper focal length.

The bottom of the camera casing 42 is closed by a wall 47, while the top thereof is closed by a door 48 hingedly connected to the casing as at 49. A latch 51 is provided to ensure the door remaining in closed position while the camera is loaded with film.

Mounted on door 48 is a variable speed electric motor 52 having its shaft 53 normally extending through the door and into the casing 42. A flanged hub member 54 is secured to shaft 53 by means of set screw 55, the flange having a pair of pins 56 extending therefrom. A drum 57 formed of transparent plastic material is mounted on hub member 54, the pins 56 extending into bores formed in the drum and causing rotation thereof with the hub member 54. A locking nut 58 is provided for securing the drum 57 on hub 54. The side edges of a groove 58 formed in the inner periphery of drum 57 are cut back at an angle to ensure the retention of a strip of film 59 in the groove.

Bores 60 are formed in the lower portion of casing 42 to receive the posts 36. Metallic balls 61 are forced into bores 60 in order to receive the thrust of the posts 36. The rear portion of casing 42 is provided with a headed pin 62 which is adapted to be received in the notch of angle bracket 39. From the foregoing, it will be apparent that the camera is supported at three points, the posts 36 being adjustable vertically, as aforedescribed, to bring the lens of the shutter and lens combination 46 into axial alignment with opening 26 of periscope 15.

It will be apparent, from the foregoing, that the camera may be readily removed from its supporting structure by loosening locking means 29, turning the locking means at right angles, sliding camera supporting table 31 back, thus withdrawing the camera lens from opening 26. The camera is now free to be lifted from supporting posts 36 and bracket 39.

A motor control assembly 63 is mounted on the rear portion of table 22 to provide means for accurately adjusting the speed of motor 52.

In order to provide for loading and unloading film without the use of a dark room, the camera may be provided with a dark bag 64 having lower and upper elastic fitted openings 65 and 66 adapted to be respectively set in groove 67 extending around the periphery of casing 42 and around the motor 52.

Dark bag 64 is, also, provided with a pair of arm receiving openings 68 which are fitted with elastic. It will be apparent that a film can may be passed through one of the arm openings 68, the arms of the operator being put through the openings thereafter, the camera opened, and the film transferred from the drum of the camera to the can or vice versa in the absence of light. The can employed herewith may be in the form of a developing can whereby the film may be developed at the scene of operation without the use of a dark room, or, selectively, it may be a light-tight container whereby the film may be transferred to a dark room for later developing.

In order to provide for the still photographing of individual frames by the camera 41, a knurled head 71 may be provided on the extension 72 of shaft 53 of motor 52, a marker 73 being provided on the head as a reference point. Plate 74 of the motor is provided with a plurality of spaced radial markers 75 to indicate the proper spacing of individual frames on the film. It will, thus, be apparent that one frame may be employed as a title in conjunction with the data card device 70 and the remainder of the film used for photographing, at high rotative speed, the trace of an oscillograph.

It is, also, apparent that the camera may be employed to photograph individual still photographs by moving the film one frame at a time by aligning the reference marker 73 with successive markers 75 until a complete revolution of the drum is accomplished.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. Light excluding apparatus for a high speed drum type camera for recording the trace of a cathode-ray oscillograph and comprising, a casing, a hinged door assembly on the top of said casing having means for carrying said drum, a flexible light-tight dark bag, said dark bag having an upper opening and a lower opening, elastic ring elements hem-secured to the material surrounding said openings whereby the material of the bag surrounding said upper opening and said lower opening is drawn in light-tight engagement around said door assembly and said casing respectively, a pair of arm receiving portions forming a part of said dark bag at the sides thereof and each having an opening in the ends thereof.

2. Light excluding apparatus for use with a camera comprising a rotatable film drum, a grooved housing for said camera, a hinged cover assembly for said housing and having said drum rotatably secured thereto, a dark bag formed of light-tight flexible material, said dark bag having a pair of arm receiving openings, said dark bag having a housing receiving opening and a cover assembly receiving opening, and elastic bands secured to the material encircling said openings for snugly engaging the housing, the cover assembly and adapted to snugly engage the arms of the user respectively whereby light may be excluded while the hinged cover assembly is opened and film is removed from the drum.

3. In combination with a high speed drum type camera for recording the trace of a cathode-ray oscillograph on a film carried by said drum and having a motor mounted thereon for rotating said drum, a dark bag having upper and lower openings, elastic elements secured to said bag surrounding and normally constricting said openings, said lower opening surrounding the upper portion of said camera and said upper opening surrounding the lower portion of said motor and being constricted by said elements into light-sealing relation therewith, and a pair of arm receiving openings in said dark bag whereby said film may be removed in a lighted room.

4. A high speed drum type camera for recording the trace of a cathode ray oscillograph on a film comprising, a casing, a hinged door for said casing, a motor mounted on said door, said motor having a shaft extending through the door, a clear plastic drum mounted on said shaft and rotatable therewith, a lens disposed in an opening in said casing in optical alignment with said drum, a dark bag having upper and lower openings, elastic ring elements hem-secured to the material surrounding said openings whereby the material of the dark bag is drawn in light-tight condition around the motor and the casing respectively, and a pair of arm receiving openings in said dark bag whereby light may be excluded while said hinged door is opened and a film is removed from said drum.

References Cited in the file of this patent

UNITED STATES PATENTS

| Number | Name | Date |
| --- | --- | --- |
| 2,189,583 | Hollman | Feb. 6, 1940 |
| 2,286,229 | Richards | June 16, 1942 |
| 2,420,719 | Park | May 20, 1947 |
| 2,483,147 | Mol | Sept. 27, 1949 |
| 2,487,506 | Zaleski | Nov. 8, 1949 |
| 2,504,362 | Verhoeff | Apr. 18, 1950 |
| 2,551,597 | Hall | May 8, 1951 |
| 2,639,210 | Robertson et al. | May 19, 1953 |